June 2, 1970 J. GOSS ET AL 3,516,073
DATA AND CONTROL CHARACTER DISCRIMINATION SCHEME FOR DIGITAL COMPUTER SYSTEM
Filed April 1, 1968 2 Sheets-Sheet 1

INVENTORS
JONATHAN GOSS
DENNIS E. WESTLIND
BY Kenneth S. Grace
ATTORNEY

United States Patent Office 3,516,073
Patented June 2, 1970

3,516,073

DATA AND CONTROL CHARACTER DISCRIMINATION SCHEME FOR DIGITAL COMPUTER SYSTEM

Jonathan Goss and Dennis E. Westlind, St. Paul, Minn., assignors to Sperry Rand Corporation, New York, N.Y., a corporation of Delaware Filed Apr. 1, 1968, Ser. No. 717,661
Int. Cl. G06f *3/00*
U.S. Cl. 340—172.5 4 Claims

ABSTRACT OF THE DISCLOSURE

A scheme for discriminating between data characters and control characters transmitted by a Remote Computer to its associated Duplex Line Adapter at a Remote Site in a multi-computer data processing system. The scheme involves the addition of a logical circuit to an already existing Duplex Line Adapter which is intermediate the Remote Computer and its communication link to a Central Computer at the Central Site. The logical circuit is responsive to a single bit in the multi-bit data characters and control characters whereby the single monitored bit discriminates between data characters and control characters and between certain control characters.

BACKGROUND OF THE INVENTION

The present invention is directed toward a multi-computer data processing system operating in real time wherein a plurality of independently operable Remote Computers, at a plurality of Remote Sites, communicate with an independently operable Central Computer, at a Central Site. At each Remote Site, intermediate the Remote Computer and its communication link, there exists a Duplex Line Adapter which, under control of the Remote Computer, receives information in a character serial, character bit parallel message format from the Remote Computer, and acting upon such information transmits such information in a character serial, character bit serial message format between itself and the communication link. A similar arrangement exists at the Central Site whereby the information is reconverted from the character serial, character bit serial message format and is coupled to the Central Computer in the character serial, character bit parallel message format. In such a system it is customary for the Remote Site to precede the transmission of the information with synchronization (SYN) characters for purposes of synchronizing the Remote and Central Sites. These synchronization characters are followed by a start of message (SOM) character which is immediately followed by a series of data (DATA) characters which, in turn, are immediately followed by an end of message (EOM) character and then a block parity (LRC) character. The receiving computer identifies and reacts uniquely for each of the various character forms.

In prior art systems, each control character was uniquely coded. Decoding networks decoded the unique code associated with each control character, distinguished between data characters and control characters and between the various control characters. Thus, such systems used a multi-bit code associated with each character to discriminate between the particular character form. The present invention relates to a scheme whereby a single bit in the multi-bit data and control characters is monitored to discriminate between data and control characters and between certain control characters whereby there is achieved a savings in decoding hardware.

SUMMARY OF THE INVENTION

The present invention relates to a scheme for discriminating between the data and control characters transmitted by a Remote Computer to its associated Duplex Line Adapter which links the Remote Computer to the Central Computer in a multi-computer data processing system. The scheme involves the addition of a logical discrimination circuit to an existing Duplex Line Adapter which is logically intermediate the Remote Computer and its communication link with the Central Computer. The discrimination circuit is responsive to a single bit in the multi-bit data and control characters whereby the single monitored bit discriminates between data and control characters and between certain control characters as transmitted by the Remote Computer to the Duplex Line Adapter.

Figure 5:
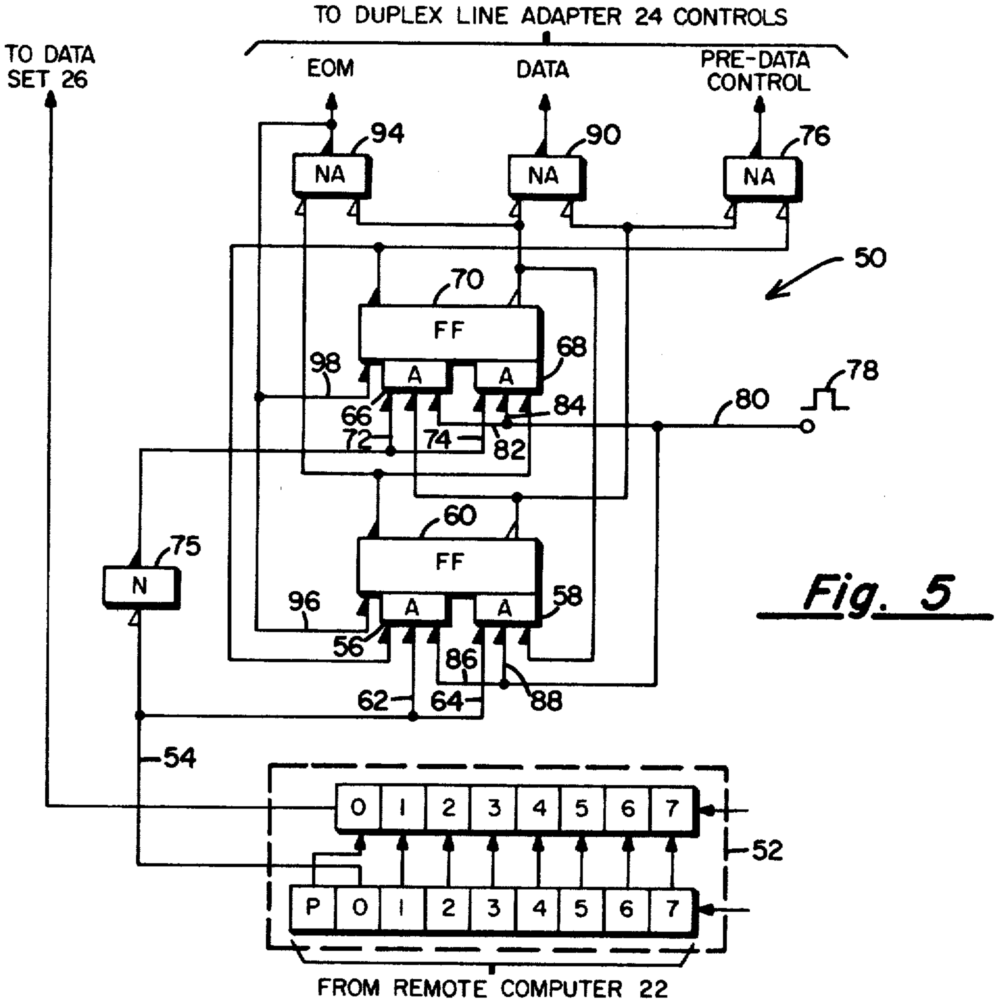
FIG. 5 is a block diagram of the discriminator circuit of the present invention.

FIGS. *6a, 6b, 6c* are block diagrams, and their associated truth tables, of the logic circuits utilized in FIG. 5.

DESCRIPTION OF THE PREFERRED EMBODIMENT

Figure 1:
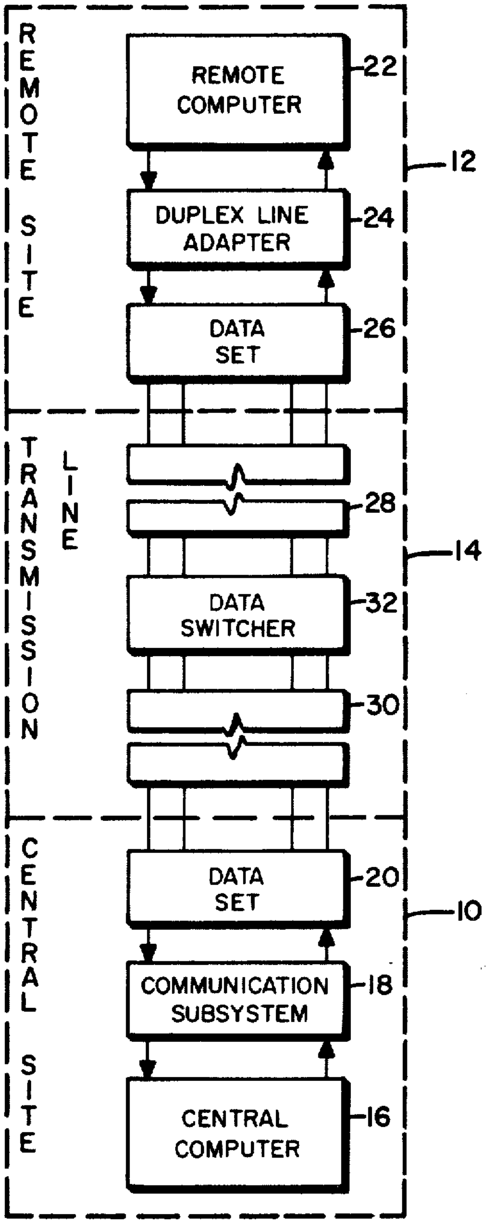
FIG. 1 is a block diagram of a data processing system in which the present invention is incorporated.

With particular reference to FIG. 1 there is presented a block diagram of a data processing system whereby a plurality of Remote Computers, at a plurality, of Remote Sites, communicate with a single Central Computer, at a single Central Site, over respectively associated communication links comprised of leased telephone lines. Transmission is bidirectional whereby the independently operable Central Computer has selective ready access, on a real time basis, to each of the independently operable Remote Computers.

The illustrated embodiment of FIG. 1 is broadly composed of Central Site 10 coupled to a plurality of Remote Sites 12 by their respectively associated Transmission Lines 14. Central Site 10 includes Central Computer 16, which is a Univac 1108 Computer, a Communication Subsystem 18, which is a Univac Communications Terminal Module Subsystem T8236, and a Bell System 303C5 Data Set 20 which couples its respectively associated Transmission Line 14 to multi-duplexing switching Communications Subsystem 18. Remote Site 12 includes a Remote Computer 22, which is a Univac 9200 Computer, a Duplex Line Adapter 24, which is a Univac Duplex Line Adapter II, F1050–00 and a Bell System 303C5 Data Set 26 which couples the Remote Site 12 to its respectively associated Transmission Line 14. Transmission Line 14 is a four wire transmission line system leased from the Bell Telephone Company System and includes at least two transmission line portions 28, 30 implemented by a Bell System 758C Data Switcher 32.

The data processing system of FIG. 1 is a duplex, synchronous real time communications link transmitting data at a synchronous data rate of 50,000 bits per second (simplex). Information is transmitted in the character forms;

Synchronization Character (SYN)
Start of Message Character (SOM)
Data Character (DATA)
End of Message Character (EOM)
Block Parity Character (LRC)

and is character serial between Central Computer 16 and Remote Computer 22. Transmission between Central Computer 16 and Communication Subsystem 18 and between Remote Computer 22 and Duplex Line Adapter 24 is character bit parallel while communication between Communication Subsystem 18 and Duplex Line Adapter 24 is character bit serial. As stated above, the data processing system of FIG. 1 is an existing system into which the discriminating scheme of the present invention is incorporated. The present invention consists of the incorporation of the discriminator circuit of FIG. 5 into the Duplex Line Adapter 24 of Remote Site 12. Accordingly, discussion hereinafter shall be primarily directed toward a discussion of the operation of Remote Site 12.

Duplex Line Adapter 24 is a duplex, synchronous communications line terminal which provides a real time communications link between Remote Computer 22 and a Data Set 26 whereby information is transmitted to a Central Computer 16 over a leased Transmission Line 14. Data Set 26 is a standard item of a Bell Telephone Company data communication system, and, consequently, no detailed discussion of the operation of Data Set 26 shall be given herein. For purposes of the present invention it is sufficient to state that Data Set 26 emits a frequency modulated signal on Transmission Line 14 as a function of a digital input. Data Set 26, as a transmitter, mixes 8 data channel frequencies together and simultaneously sends either a Mark or Space for each channel over the Transmission Line 14. On channel number 1 a Mark output signal is 730 cycles per second (Hz.) and a Space output signal is 800 Hz. The functional relationship of Data Set 26 in the illustrated embodiment of FIG. 1 is such that with a logical:

"1" signal level input, channel number 1 emits a high frequency (800 Hz.) Space output signal of 6 volts peak-to-peak;

"0" signal level input, channel number 1 emits a low frequency (730 Hz.) Mark output signal of 6 volts peak-to-peak.

Figure 2:
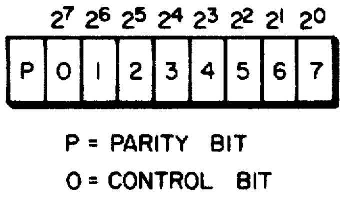
FIG. 2 is an illustration of the $n+P$ bit character format as transmitted character bit parallel between the Remote Computer and the Duplex Line Adapter.
Figure 3:
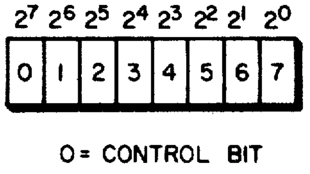
FIG. 3 is an illustration of the $n$-bit character format as transmitted character bit serial between the Duplex Line Adapter and its associated Transmission Line.

Transmission over Transmission Line 14 is, as stated above, in a synchronous mode at a rate of 50,000 bits per second (simplex) as controlled by Remote Site 12 and/or Central Site 10. Communication between Remote Computer 22 and Duplex Line Adapter 24 is in a character serial, character bit parallel message format in the $n+P$ bit character format illustrated in FIG. 2. The character format from left to right, consists of a 9-bit byte: a line parity bit P; a control bit 0 ($2^7$); and the 7 data bits 1–7 ($2^6$–$2^0$), where bit 0 is the highest ordered, or most significant bit, and bit 7 is the lowest ordered, or least significant bit, of the character. Transmission between Duplex Line Adapter 24 and Data Set 26 (and Communication Subsystem 18) is in a character serial, character bit serial message format in the $n$-bit character format of FIG. 3. The 8-bit byte format of FIG. 3 is identical to that of FIG. 2 except that the line parity bit P has been deleted therefrom and line parity is inserted in the control bit 0 position. Additionally, the message may include a block parity character (LRC), i.e., the Duplex Line Adapter 24 may convert the line parity from bit P to bit 0 and add a block parity character (LRC) for transmission of message parity to the Central Computer 16. As the control bit 0 of FIG. 2 is not utilized for the transmission of line parity, or data, the control bit 0 of FIG. 2 is coded by Remote Computer 22 such that only the data characters have a "0" in their control bit 0 position, all other characters have a "1" in their control bit 0 position.

Figure 4:
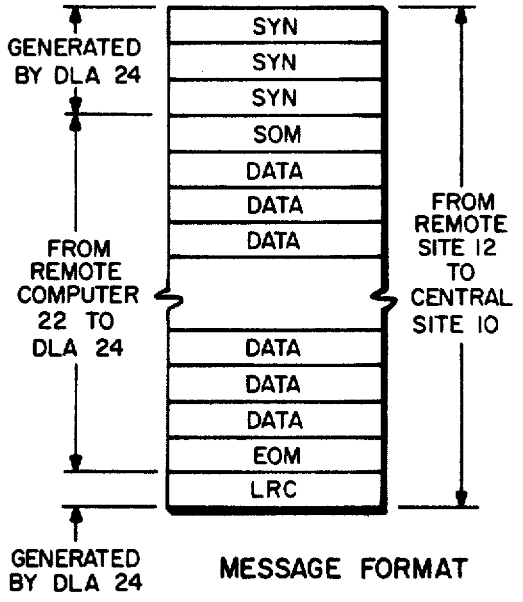
FIG. 4 is an illustration of the message format utilized in the system of FIG. 1.

Transmission of information, or a message, between Remote Computer 22 and Central Computer 16 has the general format illustrated in FIG. 4. It is to be appreciated that many preceding and succeeding control signals must pass between Central Computer 16 and Remote Computer 22 for the transmission of a message therebetween. However, for purposes of the present invention discussion of the illustrated embodiment shall be substantially limited to transmission of the message format of FIG. 4. Initially, after the necessary conditioning of Central Site 10 and Remote Site 12 for a transmission therebetween, e.g., from Remote Computer 22 to Central Computer 16, Remote Site 12 transmits, over Transmission Line 14, a multicharacter message having the format of FIG. 4. This message format starts out with a series of 8-bit (see FIG. 3) synchronization characters (SYNC) generated by Duplex Line Adapter 24. These synchronization characters synchronize Remote Site 12 with Central Site 10 in preparation for the transmission of the message from Remote Computer 22 to Data Set 26 and thence through Transmission Line 14 to Central Site 10. Next, a start of message character (SOM) is received from Remote Computer 22 whereby the Duplex Line Adapter 24 is set up to act upon the subsequently received data characters (DATA) and end of message character (EOM). All 9-bit characters—see FIG. 2—from the start of message character (SOM) through the end of message character (EOM) are received by Duplex Line Adapter 24 from Remote Computer 22 in a parallel bit stream (character serial, character bit parallel message format), and are assembled into 8-bit characters — see FIG. 3; the line parity bit P is dropped and line parity is inserted in the control bit 0 position before being transferred in a serial bit stream (character serial, character bit serial message format) to Data Set 26 and thence out Transmission Line 14.

Duplex Line Adapter 24, during the parallel-to-serial conversion process, performs character (line) and message (block) parity generation upon the message to be transmitted (from the start of message character through the end of message character). The detection of the end of message character indicates to Duplex Line Adapter 24, which is generated by Duplex Line Adapter 24, that the block parity character (LRC) will be the next character to be transmitted in the serial bit stream of information to Data Set 26. After the end of message character has been received and the block parity character has been generated, the message has been assembled into 8-bit bytes (a parity bit in the control bit 0 position, and seven data bits), disassembled bit serially and transferred to Data Set 26. Duplex Line Adapter 24 then drops out of the transmit mode whereupon the Central Computer 16, through the Communication Subsystem 18, may communicate with other Remote Sites 12 through their associated Transmission Lines 14. Central Computer 16 may simultaneously transmit to and receive from Remote Site 12.

With particular reference to FIG. 5 there is presented a block diagram of a discriminator circuit 50 incorporating the inventive concept of the present invention which discrimination circuit 50 is incorporated in Duplex Line Adapter 24 of FIG. 1. Discriminator circuit 50 monitors the control bit, i.e., bit 0 ($2^7$), of the 9-bit byte of FIG. 2 as received from Remote Computer 22 and develops signals that permit it to maintain control of its internal operation. As stated hereinabove, Duplex Line Adapter 24 converts the 9-bit byte of FIG. 2, which is received from Remote Computer 22 in a character serial, character bit parallel message format, into the 8-bit byte of FIG. 3, which is transmitted to Data Set 26 in a character serial, character bit serial message format. The message format of FIG. 4, from the start of message character (SOM) through the end of message character (EOM), as stated above, is received by the Duplex Line Adapter 24 from Remote Computer 22 in the character format of FIG. 2. Line parity bit P is deleted from the 9-bit byte of FIG. 2 and line parity is added in control bit 0 position of each 8-bit byte of FIG. 3 as it is assembled in the character bit serial form and subsequently transmitted to Data Set 26.

For purposes of the present discussion assume that Duplex Line Adapter 24 includes a message converter 52 in which each 9-bit byte of the message as received in a parallel stream from Remote Computer 22, from start of message character (SOM) through end of message character (EOM) is collected. The three synchronization characters (SYNC) are added in front of the start of message character (SOM) and the block parity character (LRC) is added in back of the end of message character (EOM) with the message then transmitted in a serial stream to Data Set 26. Bit 0 of each character, as received by Duplex Line Adapter 24, is coded by Remote Computer 22 such that each data character bit 0 is a "0" and each control character bit 0 is a "1." By definition, the start of message character (SOM) and the end of message character (EOM) are control characters which are coded to contain a "1" in their control bit 0. In contrast, the data characters (DATA) are not control characters as they comprise the text of the message, and, accordingly, have a "0" in their control bit 0. Thus, discriminator circuit 50 monitors this single control bit 0 to discriminate between data and control characters to implement an improved operation utilizing a minimum of translation electronics.

Bit 0 of each 9-bit character as received by Duplex Line Adapter 24 from Remote Computer 22 and assembled in message converter 52, is coupled to line 54 which is coupled to clear and set AND gates 56, 58, respectively, of flip-flop 60 by way of lines 62, 64. Additionally, bit 0 is coupled to the clear and set AND gates 66, 68, respectively, of flip-flop 70 by means of lines 72, 74 through inverter 76. Flip-flops 60, 70 are initially master cleared and thus the "1" in bit 0 of the first character received from Remote Computer 22, i.e., the start of message character (SOM), and the "1" from the set side output of flip-flop 70 enable AND gate 58 thereby setting flip-flop 60. The outputs from the set side of flip-flop 60 and the clear side of flip-flop 70 now enable Pre-Data Control AND gate 76, the output of which is coupled to Duplex Line Adapter 24 control for informing Duplex Line Adapter 24 that a Pre-Data Control character, i.e., start of message character has been reecived by Duplex Line Adapter 24.

The next character received by Duplex Line Adapter 24 and held in message converter 52 is a data character, and, accordingly, control bit 0 contains a "0." Accordingly, the output from inverter 75 satisfies one of the conditions for enabling AND gates 66, 68 of flip-flop 70. As flip-flop 60 has also remained in the set condition, the signal from the output of flip-flop 60 has also remained in the set condition, the signal from the output of flip-flop 60 plus a timing signal 78, which is coupled to line 80, and accordingly, to AND gates 66, 68 of flip-flop 70 by way of lines 82, 84, respectively, and to AND gates 56, 58 of flip-flop 60 by way of lines 86, 88, respectively, satisfy the remaining conditions for enabling AND gate 68 of flip-flop 70, the output of which in turn set flip-flop 70. Now, with both flip-flop 60 and flip-flop 70 in a set condition, AND gate 76 is disabled and Data AND gate 98 is enabled. The output of Data AND gate 98 transmits a Data signal to Duplex Line Adapter 24 control indicating that a data character has been received.

For each of the remaining data characters the control bit 0 contains a "0," and, accordingly, the logical significance of discrimator circuit 50 remains unchanged.

Upon receipt of the end of message character by message converter 52, the "1" on line 54 changes to a "0" again satisfying one of the conditions for enabling AND gates 56, 58 of flip-flop 60. As flip-flop 70 has remained in a set condition, AND gate 56 is enabled thereby clearing flip-flop 60 which in turn disables Data AND gate 90 and enables EOM AND gate 94. The output from EOM AND gate 94 is transmitted to Duplex Line Adapter 24 control indicating that an end of message character has been received. Additionally, the output from the EOM AND gate 94 is coupled to flip-flops 60, 70 by lines 96, 98, respectively, clearing both flip-flop 60 and flip-flop 70 whereby discriminator circuit 50 is placed in a ready condition for the receipt of the next successive message.

Figure 6A:
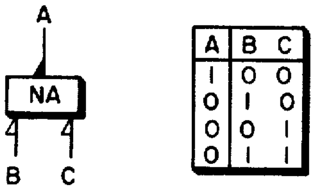
Figure 6B:
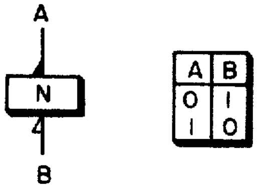
Figure 6C:
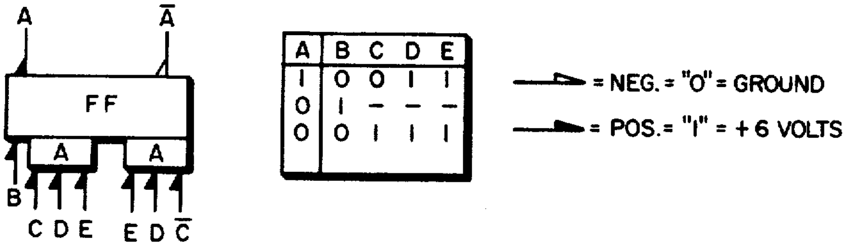

With particular reference to FIGS. 6A through 6C there are illustrated the logic circuit types that are utilized in the description of the illustrated embodiment of the present invention and their associated truth tables. The circuits are well-known, are commercially available and, accordingly, shall not be described in detail since this would not add to an understanding of the present invention. It is, of course, understood that other types of logic configurations could be utilized in implementing the present invention; those shown herein have been found to be advantageous, both with regard to cost and operation. Any description of the operation of the illustrated embodiment certain logic configurations have been assumed. In this regard a closed arrow arrow shall be equivalent to a +6 volt signal which shall be equivalent to a logical "1" and representative of a positive signal while an open arrow shall be equivalent to a ground signal which shall be equivalent to a logical "0" and representative of a negative signal.

Thus, it is apparent that there has been described and illustrated herein a preferred embodiment of the present invention that provides an improved scheme for discriminating between data characters and control characters as transmitted between a Remote Computer and its associated Duplex Line Adapter and thence over telephone lines linking Remote and Central Computer Sites in a multi-computer data processing system. It is understood that suitable modifications may be made in the structure as disclosed provided that such modifications come within the spirit and scope of the appended claims. Having, now, fully illustrated and described our invention, what we claim to be new and desire to protect by Letters Patent is set forth in the appended claims.

What is claimed is:

1. In a data processing system for transmitting binary information between a computer and its communication link, said computer having a message format comprised of a plurality of multi-bit data and control characters which characters include a single like-ordered control bit which has a first binary form in said data characters and a second binary form in said control characters, a scheme for discriminating between data characters and control characters as transmitted by said computer including:

an independently operable computer for transmitting $n+1$ bit data and control characters in a character serial, character bit parallel message format;

a communication link for transmitting $n$-bit data control characters;

a line adapter for coupling said computer to said communication link for converting said message format from $n+1$ bit characters in a character serial, character bit parallel message format as received from said computer to $n$-bit characters in a character serial, character bit serial message format for transmission by said communication link;

said line adapter including a discriminator circuit for monitoring the single control bit in said $n+1$ bit data and control characters as received from said computer for generating control signals for discriminating between the transmission thereto of data characters or of control characters.

2. In a data processing system transmitting binary information between a computer and its communication link, said computer having a message format comprised of a plurality of multi-bit data and control characters which characters include a single like-ordered control bit which has a first binary form in said data characters and a second binary form in said control characters, a scheme for discriminating between data characters and control characters as transmitted by said computer including:

an independently operable computer for transmitting $n+P$ bit data and control characters in a character serial, character bit parallel message format;

a communication link;

a line adapter for coupling said computer to said communication link for converting said $n+P$ bit character format into an $n$-bit character format in a character serial, character bit serial message format for transmission over said communication link;

said line adapter including a discriminator circuit for monitoring the control bit in said $n+P$ bit character format for generating control signals discriminating between the transmission thereto of data characters or of control characters, and for deleting the parity bit P in said $n+P$ bit character format and for inserting the parity bit in the control bit of said $n$-bit character format.

3. A discriminator circuit for discriminating between data characters and control characters in a predetermined message format, which message format includes the character serial arrangement of a plurality of control characters, then a plurality of data characters followed a control character, which data and control characters include a single like-ordered control bit which has a first binary form in said control characters and a second binary form in said data characters, the circuit including:

first and second flip-flops having input and output sides;

an end of message AND gate having input and output sides;

a data AND gate having input and output sides;

a pre-data control AND gate having input and output sides;

means for coupling said control bit to the input side of said first and second flip-flops;

means for coupling a timing pulse to the input side of said first and second flip-flops;

means for coupling the output side of said first flip-flop to the input side of said second flip-flop and to the input side of said end of message, data and pre-data control AND gates;

means for coupling the output side of said second flip-flop to the input side of said first flip-flop and to the input side of said end of message, data and pre-data control AND gates;

means for coupling the output side of said end of message AND gate to the input side of said first and second flip-flops;

the circuit monitoring said control bit for providing;

upon the receipt of the control bit of the first synchronization character of the message, an output signal from said pre-data control AND gate indicating the receipt of a pre-data control character;

upon the receipt of the control bit of the first data character of the message, an output signal from said data AND gate indicating the receipt of the first data character of the message;

upon the receipt of the control bit of the end of message character, an output signal from said end of message AND gate indicating the receipt of the last previous data character of the message.

4. A discriminator circuit for discriminating between data characters and control characters in a predetermined message format, which message format includes the character serial arrangement of a plurality of synchronization characters, a start of message character, a plurality of data characters and an end of message character, all of said characters except said data characters being control chracters which data and control characters include a single like-ordered control bit which has a first binary form in said control characters and a second binary form in said data characters, the circuit including:

first and second flip-flops each having clear and set AND gates;

an end of message AND gate;

a data AND gate;

a pre-data control AND gate;

a control bit inverter;

means for coupling said control bit to said clear and set AND gates of said first flip-flop and to said control bit inverter;

means for coupling said control bit inverter to said clear and set AND gates of said second flip-flop;

means for coupling a timing pulse to said clear and set AND gates of said first and second flip-flops;

means for coupling the set side of said first flip-flop to the clear AND gate of said second flip-flop and to said data and pre-data control AND gates;

means for coupling the clear side of said first flip-flop to the set AND gate of said second flip-flop and to said end of message AND gate;

means for coupling the set side of said second flip-flop to the set AND gate of said first flip-flop and to said end of message AND gate and to said data AND gate;

means for coupling the clear side of said second flip-flop to the clear AND gate of said first flip-flop and to said pre-data control AND gate;

means for coupling the output of said end of message AND gate to the clear side of said first and second flip-flops;

the circuit monitoring said control bit for providing;

upon the receipt of the control bit of the first synchronization character of the message, an output signal from said pre-data control AND gate indicating the receipt of a pre-data control character;

upon the receipt of the control bit of the first data character of the message, an output signal from said data AND gate indicating the receipt of the first data character of the message;

upon the receipt of the control bit of the end of message character, an output signal from said end of message AND gate indicating the receipt of the last previous data character of the message.

References Cited

UNITED STATES PATENTS

| | | | |
|---|---|---|---|
| 3,406,380 | 10/1968 | Bradley et al. ______ | 340—172.5 |
| 3,363,234 | 1/1968 | Erickson et al. _____ | 340—172.5 |
| 3,351,910 | 11/1967 | Miller et al. _______ | 340—172.5 |
| 3,307,152 | 2/1967 | Robbins __________ | 340—172.5 |

GARETH D. SHAW, Primary Examiner